United States Patent Office 2,695,246
Patented Nov. 23, 1954

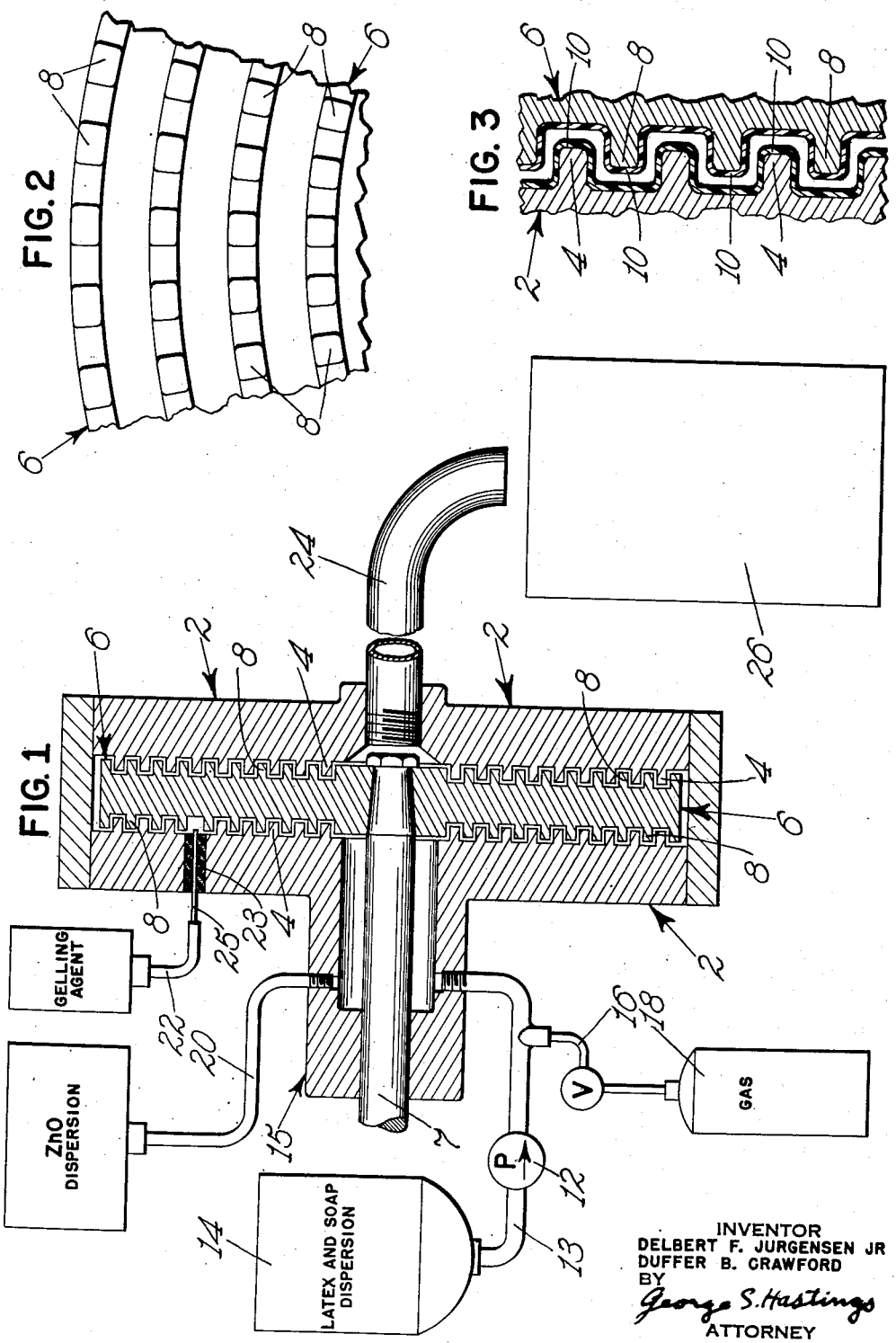

2,695,246

APPARATUS FOR FOAMING RUBBER AND METHOD OF COATING SAME

Delbert F. Jurgensen, Jr., Tuckahoe, N. Y., and Duffer B. Crawford, Palisades Park, N. J., assignors, by mesne assignments, to E. T. Oakes Corporation, Islip, Long Island, N. Y., a corporation of New York Application September 2, 1950, Serial No. 183,002

16 Claims. (Cl. 117—46)

This invention relates to the foaming of rubber latex, and particularly to foaming rubber latex in continuous mixers of the closed type.

Latex solutions are highly unstable against mechanical action and are readily coagulated by even the slightest friction. Heretofore, foam rubber has been manufactured principally by batch methods. Attempts to manufacture foam rubber by continuous mixing methods have been unsatisfactory, particularly because small particles of coagulated rubber adhere to the whipping elements of the machine, causing poor foam and ultimate jamming of the machine.

It is an object of this invention to provide a method of treating the whipping elements of these machines to prevent coagulated latex particles from adhering thereto.

It is a further object of our invention to continuously foam a rubber solution containing gelling agents. So far as we know, no one has successfully foamed rubber continuously in the presence of a gelling agent. While in theory this is preferable, still the increased tendency of the already unstable latex to coagulate has heretofore prohibited incorporating the gelling agent during the foaming. We believe that this results from small coagulated particles of latex adhering to the whipping elements and forming nuclei upon which more latex coagulates or precipitates.

It is our invention to provide a means and a method by which foam rubber may be manufactured by a continuous mixing process.

It is also our invention to treat the agitating parts of a continuous mixer with a smooth surface-forming material to which no small coagulated particles will adhere initially. An aqueous latex dispersion is polar. Since polar compounds adhere to polar compounds, non-polarity plays an important role in the selection of a coating material.

Smoothness of surface, however, is also of great importance, and at least one polar substance, Bakelite, serves well as a coating to which latex coagula do not adhere. Bakelite has a very smooth surface. Coatings of paraffin, Teflon, polyethylene, microcrystalline waxes and silicone resins, too, when properly applied to the whipping elements of a continuous mixer, tend to prevent the adherence of the coagulated latex to the surfaces thereof.

The total running time without cleaning of a continuous mixer has been remarkably increased by treating it with paraffin. For example, in one commercial plant, with a continuous mixer of the type described in Oakes application, S. N. 657,822, filed March 28, 1946, the running time with gelling agent present, and without coating, averaged only 15 to 30 minutes, whereas after treatment with paraffin having a melting point of 135° F., it was increased to as much as 8 hours, averaging between 6 and 7 hours, before failure or deterioration in the foam quality.

With our invention, we have produced a high quality latex foam by coating the agitating members of a continuous mixer of the type referred to in the above Oakes application.

With our method we are able to pipe a compounded latex and soap solution to the mixer, add the zinc oxide and gel dispersion and foam the whole, with the incorporation of air (or other suitable gas such as $N_2$). The foam may then be discharged into suitable molds.

In the accompanying drawings:

Fig. 1 shows schematically a preferred application of our invention; and

Fig. 2 shows a section of the rotor illustrating the modified corners of the teeth; and Fig. 3 is a partial view of a portion of the rotor and stator showing the coating thereon.

Referring to the drawing, we show schematically a preferred application of our invention for foaming rubber in a continuous mixer. 2 indicates the housing or stator, while 4 indicates the teeth of the stator. Mounted within and keyed on the drive shaft 7 is a similarly constructed rotor 6 having teeth 8. The coating 10 is applied as hereinafter described to both the stator and rotor including their respective teeth. A latex and soap mixture is pumped from the tank 14 into the hub 15 of the mixer by a suitable pump 12 through the pipe 13.

Gas is supplied to the head of the mixer through the pipe 16 from a source 18. A zinc oxide dispersion is supplied to the hub 15 of the mixer by a pipe 20. A gelling agent, as for example, sodium silicofluoride, is then admitted through the pipe 22 and needle 25 into the head of the mixer. This needle 25 pierces a cork or rubber plug 23 located in a suitable bore in the stator 2.

The latex mixture is thoroughly foamed by incorporation of the compressed air through the action of the whipping elements, stator 2 and rotor 6. The foam leaves the mixer through discharge conduit 24 and is deposited in a suitable mold 26.

Prior to this foaming procedure, the rotor and stator are coated in one of the following ways:

Waxes

In view of its low cost, paraffin, a non-polar compound, is one of the most suitable coatings. The coacting whipping elements of the rotor and stator are first etched or roughened as by sand-blasting. We have also found it advantageous to break any sharp edges on the whipping elements, such as the teeth 4, 8, to approximately a 1/32" radius as shown in Fig. 2 illustrating the rotor. The teeth of the stator would, of course, be similar in this respect. This slight rounding does not interfere with the function of the element but does slow the rapid tendency of the coating to wear at sharp edges. Paraffin, having a melting point of about 135° F., is melted and sprayed on the etched surface in sufficient quantity so as to give a dry powder-like appearance, and then flame-polished to a uniform smoothness. We have found this coating usually permits runs of six hours and occasionally as much as twenty hours have been attained without harmful build-up of the latex particles. We have found it sufficiently durable to be effective for several such runs before the foam quality fails. Between runs sections may be usually repaired merely by flaming the damaged area.

Other coatings that have given good results are:

Bakelite

Although Bakelite is, as far as we know, a polar substance, we have found it serves as a satisfactory coating. This is probably due to the very smooth surface that may be obtained when Bakelite is sprayed over the coacting whipping elements of the continuous foaming machine, dried and baked at 270° F. Bakelite coating lasts much longer (several weeks), than paraffin. However, we have found the paraffin coating preferable for commercial conditions because it is more easily applied, removed and repaired.

Silicone

Silicone organic resin can be applied with a paint brush and then baked, if necessary, depending on the particular resin chosen. It too, like Bakelite, provides a durable coating.

Teflon

Teflon, a non-polar polymer of tetrafluoroethylene, can be applied in several coatings which are each fused at 750° F.

Polyethylene

Polyethylene, also non-polar, is put on by flame-spray application and fused at 450° F.

It is believed apparent that this coating method may be used on the dasher and bowl of a batch method mixer, or the agitating elements of any mixer. We have referred particularly to its use in a continuous mixer for the reason that we have found it to be essential in adapting such mixers to the commercial foaming of rubber.

We do not intend, therefore, to limit any of the appended claims to continuous mixing devices, except those claims specifically so limited.

Having fully disclosed our invention, we claim:

1. An apparatus for foaming liquid latex including a continuous foaming machine of the closed type, said machine having co-acting, relatively movable foaming elements, means to move said foam elements relatively and a paraffin coating on said elements operative to prevent the adherence and coagulation of liquid latex particles.

2. An apparatus for foaming liquid latex comprising, a continuous mixing machine, an air-tight chamber in said machine, an inlet pipe into said chamber to admit a liquid latex suspension, an inlet pipe to admit a gelling agent into said chamber, means for introducing a gas under pressure into said chamber, co-acting whipping elements in said chamber, and a fugitive paraffin coating on said whipping elements operative to prevent the adherence and coagulation of liquid latex particles thereon.

3. An apparatus for foaming liquid latex comprising, a continuous mixing machine, an air-tight chamber in said machine, an inlet pipe into said chamber to admit a liquid latex suspension, means for introducing a gas under pressure into said chamber, co-acting whipping elements in said chamber, and a fugitive paraffin coating on said whipping elements operative to prevent the adherence and coagulation of liquid latex particles thereon.

4. An apparatus for foaming liquid latex comprising, a continuous mixing machine, an air-tight chamber in said machine, an inlet pipe into said chamber to admit a liquid latex suspension, co-acting whipping elements in said chamber, and a fugitive paraffin coating on said whipping elements operative to prevent the adherence and coagulation of liquid latex particles thereon.

5. An apparatus for foaming liquid latex comprising, a continuous mixing machine, an air-tight chamber in said machine, an inlet pipe into said chamber to admit a liquid latex suspension, an inlet pipe to admit a gelling liquid latex suspension, an inlet pipe to admit a gelling agent into said chamber, means for introducing a gas under pressure into said chamber, co-acting whipping elements in said chamber, and a smooth-surface coating of a waxy coating material of the class consisting of paraffin, microcrystalline waxes, polyethylene and polytetrafluoroethylene on said whipping elements operative to prevent the adherence and coagulation of liquid latex particles thereon.

6. An apparatus for foaming liquid latex comprising, a continuous mixing machine, an air-tight chamber in said machine, an inlet pipe into said chamber to admit a liquid latex suspension, co-acting whipping elements in said chamber, and a non-tacky coating of a waxy coating material of the class consisting of paraffin, microcrystalline waxes, polyethylene and polytetrafluoroethylene on said whipping elements operative to prevent the adherence and coagulation of liquid latex particles thereon.

7. In a machine for foaming liquid latex, a closed chamber, co-acting whipping elements in said closed chamber, and a smooth paraffin coating on said whipping elements operative to prevent the deposition and coagulation of liquid latex particles thereon.

8. An apparatus for foaming a gel-containing liquid dispersion of latex comprising, a chamber, an inlet pipe into said chamber, a discharge pipe from said chamber, and whipping elements located within said chamber, a smooth plastic coating of a waxy coating material of the class consisting of paraffin, microcrystalline waxes, polyethylene and polytetrafluoroethylene on said elements whereby particles of latex are prevented from adhering thereto.

9. The method of treating an apparatus having a chamber and at least one beating element therein for foaming the latices of rubber comprising, treating the active elements of said apparatus with a waxy material substantially free from affinity to latex whereby adherence of latex of the class consisting of paraffin, microcrystalline waxes, polyethylene and polytetrafluoroethylene coagulants is substantially prevented in said apparatus.

10. A method of treating the agitating elements of a mixer to be used in the foaming of a dispersion of rubber the steps which comprise, etching the surfaces of said elements, spraying said etched surfaces with a coating of melted paraffin, and flame-polishing said coating to produce a smooth surface to prevent the adhesion of rubber particles thereto.

11. The method set forth in claim 9 in which the waxy material is polytetrafluoroethylene and treating of the active elements comprises applying a coating of polytetrafluoroethylene on said surfaces and then fusing said coating at 750° F. and then applying at least one more coating to said fused coated surface and again fusing at 750° F. to produce a smooth surface to prevent the adhesion of rubber particles thereto.

12. The method set forth in claim 9 in which the waxy material is polyethylene and treating the active elements comprises flame-spraying a thin coating of polyethylene on said surfaces and then fusing said coating at 450° F. to produce a smooth surface to prevent the adhesion of rubber particles thereto.

13. In a method of treating the co-acting operative parts in the mixing chamber in a mixer to be used in foaming a dispersion of rubber the steps which comprise, roughening the surfaces of said parts and applying to said roughened surfaces a waxy smooth-surface forming coating of a waxy coating material of the class consisting of paraffin, microcrystalline waxes, polyethylene and polytetrafluoroethylene whereby said coating will adhere to said roughened surfaces and coagula of said rubber will not adhere to the smooth surface of said coating and thereby be prevented from adhering to said co-acting operative parts.

14. In a machine for foaming liquid latex, a closed chamber, coacting whipping elements in said closed chamber, and a smooth polyethylene coating on said whipping elements operative to prevent the deposition and coagulation of liquid latex particles thereon.

15. In a machine for foaming liquid latex, a closed chamber, coacting whipping elements in said closed chamber, and a smooth polytetrafluoroethylene coating on said whipping elements operative to prevent the deposition and coagulation of liquid latex particles thereon.

16. In a machine for foaming liquid latex, a closed chamber, coacting whipping elements in said closed chamber, and a smooth microcrystalline wax coating on said whipping elements operative to prevent the deposition and coagulation of liquid latex particles thereon.

References Cited in the file of this patent

UNITED STATES PATENTS

| Number | Name | Date |
|---|---|---|
| 2,137,442 | Callan | Nov. 22, 1938 |
| 2,201,537 | Hickler | May 21, 1940 |
| 2,218,433 | Mullner | Oct. 15, 1940 |
| 2,272,901 | Carter | Feb. 10, 1942 |
| 2,313,463 | Clayton et al. | Mar. 9, 1943 |
| 2,324,988 | Greenup et al. | July 20, 1943 |
| 2,381,706 | Wilson | Aug. 7, 1945 |
| 2,410,225 | Macht et al. | Oct. 29, 1946 |
| 2,435,884 | Galewski | Feb. 10, 1948 |
| 2,572,049 | Oakes | Oct. 23, 1951 |